US005717601A

United States Patent [19]

Farthing

[11] Patent Number: 5,717,601

[45] Date of Patent: Feb. 10, 1998

[54] DIMMER FAULT REPORTING

[75] Inventor: Richard Farthing, Isleworth, England

[73] Assignee: Strand Lighting Limited, Middlesex, England

[21] Appl. No.: 393,542

[22] Filed: Feb. 23, 1995

[30] Foreign Application Priority Data

Feb. 24, 1994 [GB] United Kingdom .................... 9403577

[51] Int. Cl.[6] ............................ G06F 19/00; H05B 37/02; H05B 41/36

[52] U.S. Cl. ........................... 364/492; 315/291; 315/194; 364/550; 364/483

[58] Field of Search ................................ 364/514 B, 492, 364/131, 132, 136, 138, 481, 483, 550, 551.01; 315/291, 307, DIG. 4, 199, 194, 316, 129, 130–133, 317–319; 327/20, 21, 26, 31, 35, 36, 37, 79; 361/88, 90–93; 362/227, 276, 802

[56] References Cited

U.S. PATENT DOCUMENTS

| | | | |
|---|---|---|---|
| 5,264,761 | 11/1993 | Johnson | 315/199 |
| 5,287,040 | 2/1994 | Lestician | 315/291 |
| 5,317,237 | 5/1994 | Allison et al. | 315/291 |
| 5,485,058 | 1/1996 | Watson et al. | 315/194 |
| 5,530,322 | 6/1996 | Ference et al. | 315/316 |

*Primary Examiner*—Emanuel T. Voeltz
*Assistant Examiner*—Hal. D. Wachsman
*Attorney, Agent, or Firm*—James E. Brunton

[57] ABSTRACT

The present invention concerns systems in which a plurality of device can be monitored. More particularly the invention concerns a monitoring system particularly though not exclusively for light dimmers in which requests for data are inserted into the gaps of periodic firing signals so as to trigger responses. Examples include dimming systems for use in theaters and in television and film studios.

8 Claims, 5 Drawing Sheets

DIMMER FAULT REPORTING

The present invention concerns systems in which a plurality of devices can be monitored. Examples of such systems are light dimming systems and, in particular, dimming systems for use in theaters and television or film studios. Television and film studios require high power light sources (often mobile) for selective illumination of particular characters, as do live entertainment venues such as theaters. It is necessary to be able to control the level of illumination both to provide a constant predetermined level and for providing fade-in and fade-out effects. A controlled circuit for controlling the power to and hence the level of illumination of a light source is known as a dimmer.

An increasing demand from users of dimmer equipment is for a capability which enables the equipment remotely to interrogate any dimmer to discover whether it is working correctly, whether a lamp has blown or a circuit breaker has tripped. This is known as fault reporting.

Fault reporting requires the measurement of both the output current and the voltage from each dimmer interrogated and the ability to decide from the measurements made whether a fault is present or not.

There are additional important requirements that the dimmers can be interrogated independently, can be plugged in "live" without damage or reconfiguration of the system, must be interchangeable, and can be mixed with dimmers which do not have the fault reporting facility.

Accordingly from a first aspect the present invention comprises a monitor circuit for a device in which the operation of the device is controlled by a firing signal, comprising means for inserting additional data into the firing signals for the device, and means responsive to the additional data to generate data indicating at least one operative state of the device or of an associated load.

From a second aspect the present invention comprises a method of fault reporting in which additional data is inserted into a firing signal controlling the operation of a device, this additional data is detected, and as a result of this detection, data regarding the operative state of the device or an associated load is sent back.

In order that the present invention may be more readily understood, an embodiment thereof will now be described by way of example and with reference to the accompanying drawings, in which.

Figure 1:
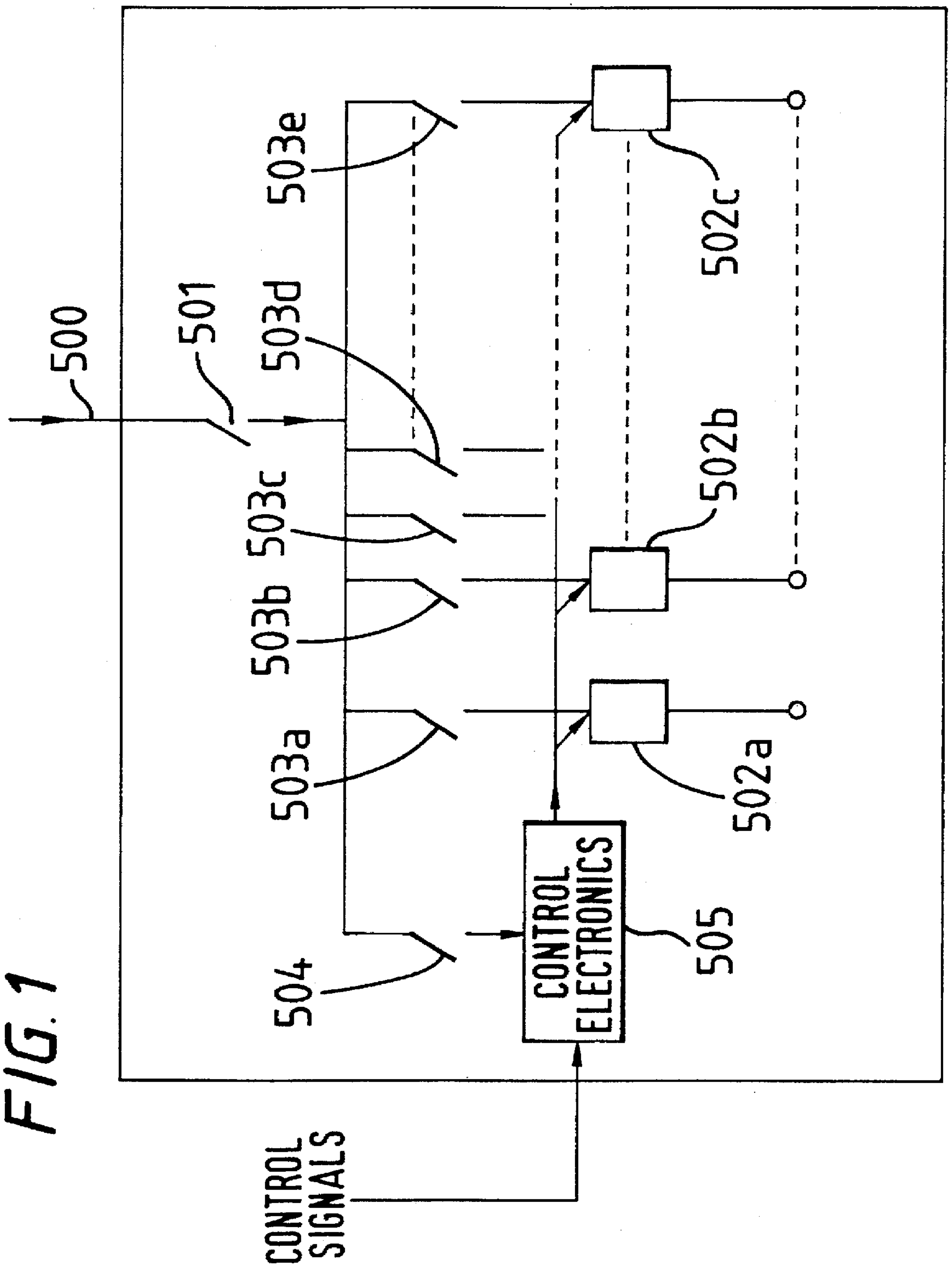
FIG. 1 is a diagram of a dimmer rack for a plurality of light sources.

Referring to FIG. 1 of the drawings, this shows a dimmer rack for controlling a number of light sources in, for example, a studio environment. Thus the dimmer rack of FIG. 1 comprises a mains supply point 500, preferably a primary isolation circuit breaker 501, a plurality of dimmer circuits **502*a*–502*c* connected to the primary isolation point 501 via individual secondary circuit control breakers 503*a*–503*e*, and a control circuit 505** connected to the control cable from a control desk (not shown). Each dimmer circuit output will be connected in use to a light source.

The control signals from the control desk may comprise digital words, for example transmitted as a series of bits, each word representing the intensity level for a given dimmer, the dimmer intensity levels being transmitted in time division multiplex form and the control electronics 505 may comprise a demultiplexer arranged to separate the signals and transmit a respective dimmer control word to each dimmer **502*a*–502*c*** in serial form, parallel form or any other convenient form (for example as an analogue voltage).

The control unit 505 is likewise isolated via a secondary circuit breaker 504; the control electronics 505 may be provided as a suitably programmed microprocessor for example.

Figure 2:
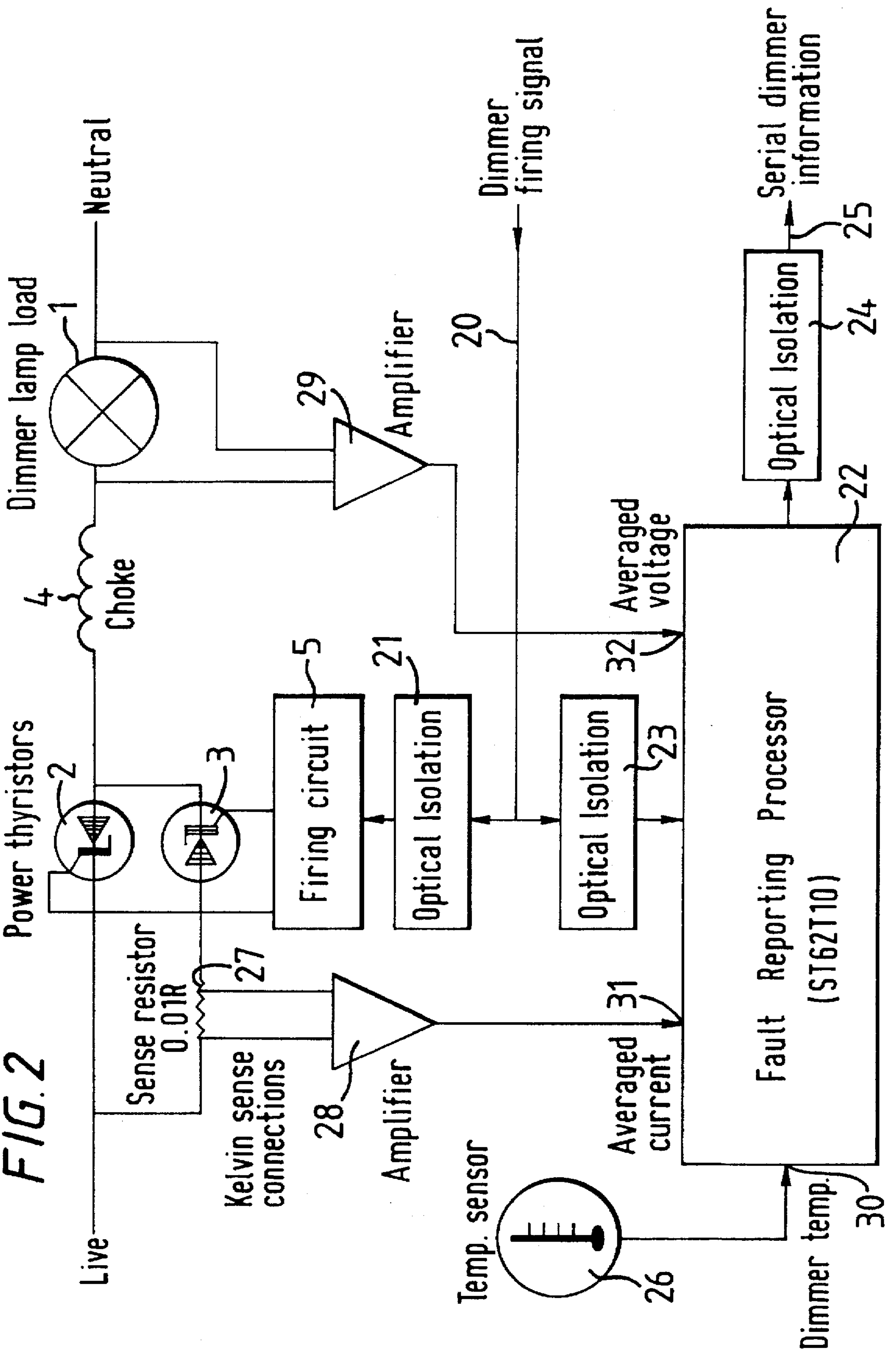
FIG. 2 is a circuit diagram of an embodiment of a dimmer fault reporting circuit.
Figure 3:
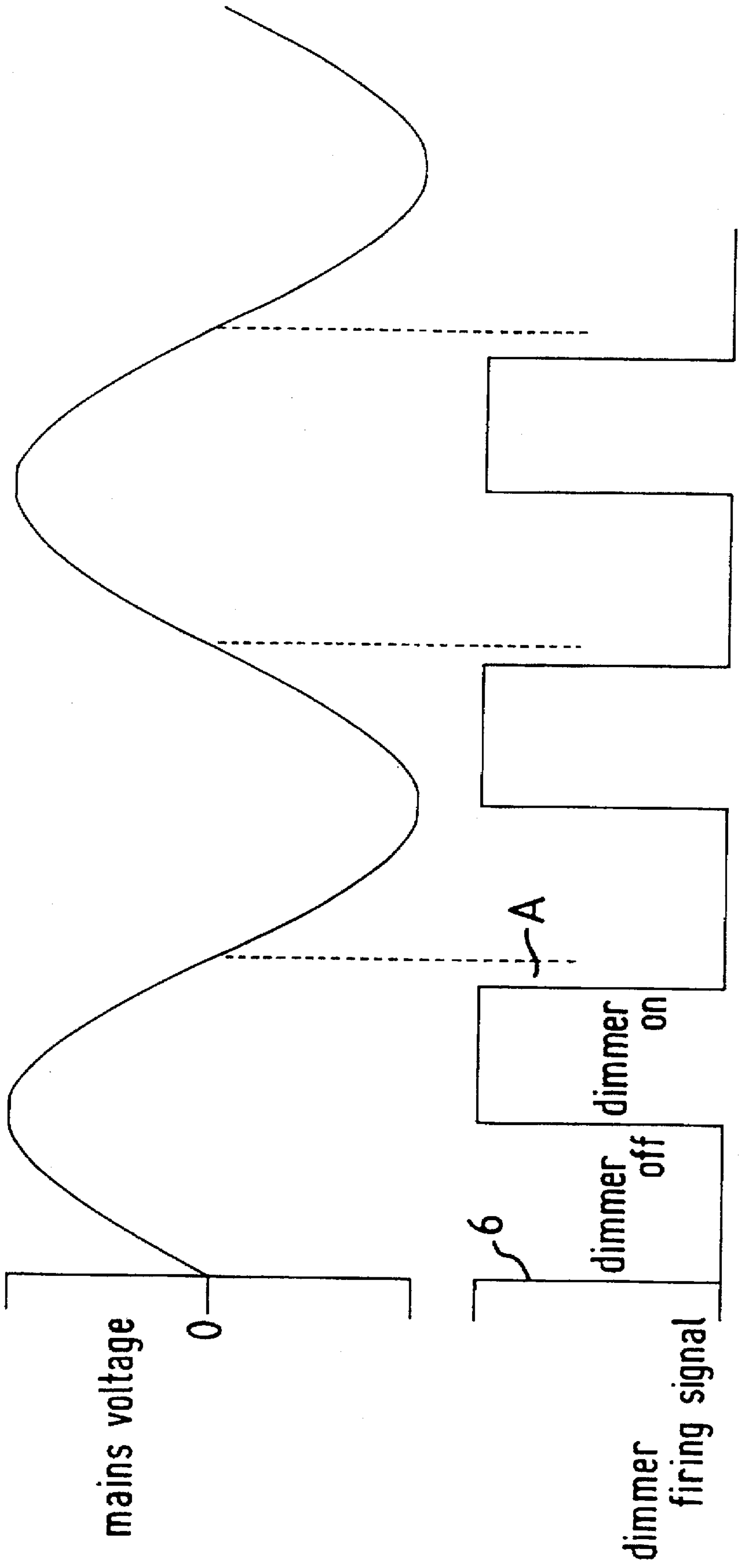
FIG. 3 shows a typical control waveform for a dimmer.

Referring now to FIG. 2 of the drawings, there is shown a light source 1 the intensity of which is controlled by a dimmer circuit comprising a pair of power thyristors 2 and 3, a choke 4, and a firing circuit 5. This basic arrangement can of course have a number of modifications, but in essence the actual power supplied to the lamp 1 is controlled by alternately switching the thyristors during appropriate half cycles of the AC mains supply, as is shown in FIG. 3 of the accompanying drawings.

This figure shows a pulse-width modulated signal 6 which is phase-locked to the AC mains and it will readily be appreciated that the power transmitted by the dimmer varies with the duty cycle of signal 6.

It is conventional to arrange dimmers in racks with each dual dimmer requiring a minimum of three control wires, namely two signal wires and a common wire. If each dimmer had to have an additional individual wire for fault reporting then in a widely used conventional configuration using a rack of ninety-six dimmers there would be a need for ninety-six additional wires. This is undoubtedly uneconomic.

A preferred embodiment in accordance with the present invention utilises twenty-four dimmers of the kind shown in FIG. 2 of the drawings bussed together with a single wire for fault reporting so that a ninety-six dimmer rack would only require a total of four additional wires to have full fault reporting capability.

Figure 4:
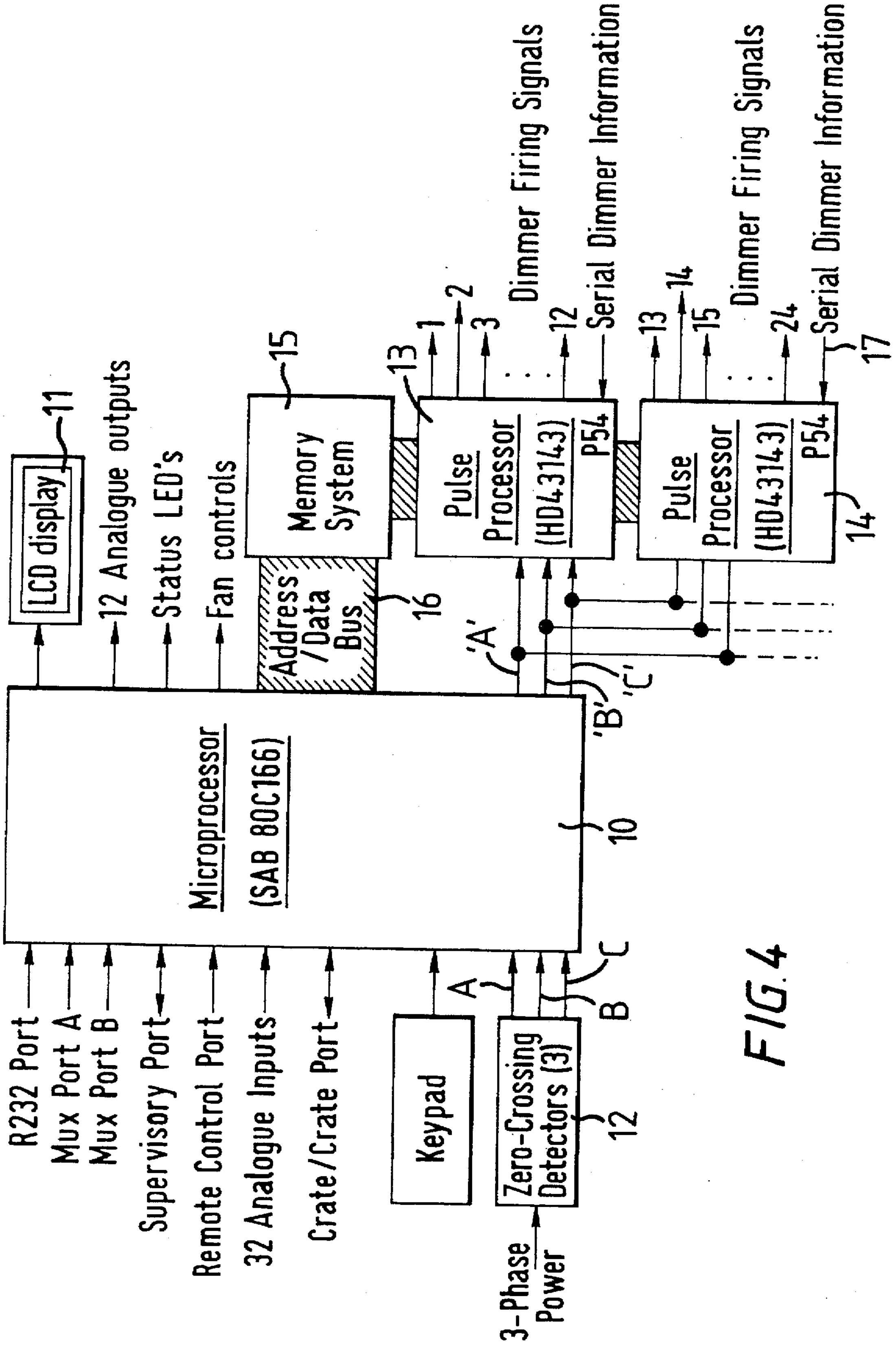
FIG. 4 is a block diagram of a control processor for the embodiment of FIG. 3.
Figure 5:
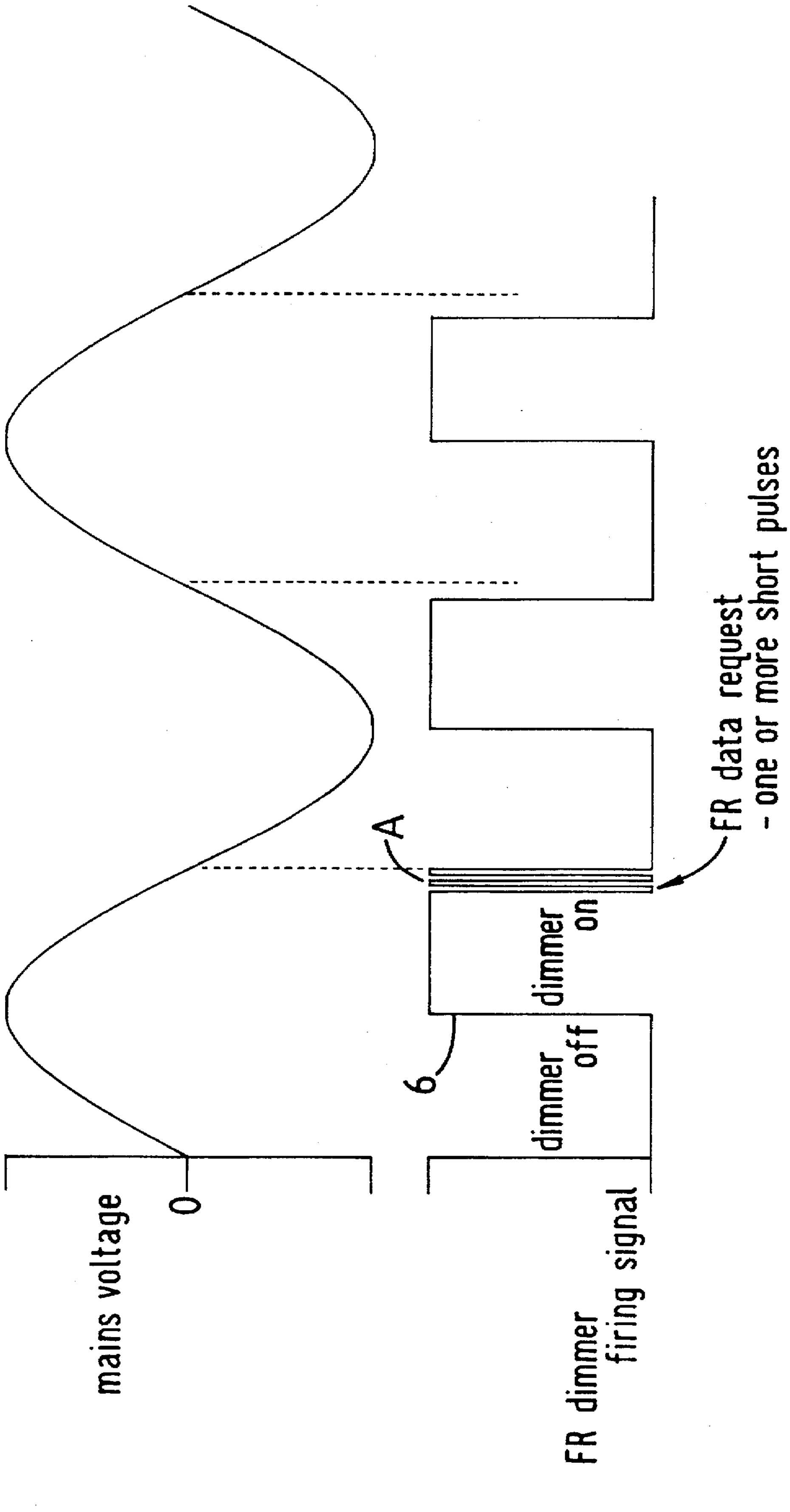
FIG. 5 is an example of a dimmer control waveform as used in the embodiment of FIG. 3.

The manner in which twenty-four individual dimmers can be interrogated selectively using a single wire involves utilising the already-described firing signal by means of which the operation of each dimmer is controlled. Thus the present embodiment utilises the time gap which is shown at A in FIG. 3 and which is present after one of the thyristors 2 or 3 in FIG. 2 has been turned off by the dimmer signal 6 and before the next half-cycle of the AC mains. It will be realised that this gap, which may be only a few hundred microseconds, must always be present before the zero-crossing of the mains to ensure correct operation of the dimmer without false triggering in the next half-cycle. Thus one or more pulses are inserted into gap A of the firing signal which is supplied to the dimmer which is to be interrogated. This is shown in FIG. 5 of the drawings. It will be appreciated that it may also be possible to utilise the gap which extends from a zero crossing to the next firing pulse provided that the height or duration of the pulses is such as not to cause premature triggering. Alternatively the added data pulses could be filtered out prior to the actual application of the trigger signal. In the embodiment being described the firing signals for the dimmers Are generated by a main processor shown in FIG. 4 of the drawings. This main processor includes a microprocessor 10 sold by Siemens AG under the part number SAB80C166. Associated width microprocessor 10 is a keypad 11 through which an operator can enter variations in the required operating characteristics, an LCD display 11 and three zero-crossing detectors 12 connected to a three-phase power supply and used to ensure that pulse width modulated dimmer drive signals output from pulse processors 13 and 14 are appropriately phase-locked. As shown, the pulse processors 13 and 14 are each connected to twelve dimmer circuits similar to that shown in FIG. 3. Timings for the pulse processor circuits are provided at $a_1$, $b_1$ and $c_1$ and, as already mentioned, these are generated via the zero-crossing detector circuit 12. Control for the pulse processor circuits is provided by the micro-processor 10 via a bus 16.

Referring again to FIG. 2, it will be seen that a dimmer firing signal from one of the pulse processors 12 or 13 is supplied to the firing circuit 5 via an input line 20 and an optical isolation circuit 21. When it is desired to interrogate a particular dimmer circuit, for example the one shown in FIG. 2, the main processor 10 inserts the pulse train as shown in FIG. 5 into the dimmer signal. This pulse train is supplied to the fault reporting processor 22 via an optical isolation circuit 23 and is detected by the fault reporting processor as a request to send information regarding the operation of the dimmer back to the main processor 10 via an optical isolation circuit 24 and an output line 25 connected to the appropriate input port of the pulse processor which sent the request, for example input port 17. The fault reporting processor 22 in the present embodiment is a very low cost/low power embedded processor manufactured by SGS-Thomson and sold under the part number ST62T10. The fault reporting processor 22 is capable of converting, on request, measured voltages, currents and temperatures into a serial data stream.

In the embodiment being described, processor 22 is arranged to monitor the temperature of the dimmer via a temperature sensor 26. The current through the dimmer is measured by a "Kelvin" connection in the main current carrying wire to thyristor 3 in the form of a sense resistor 27. The sense resistor 27 has a resistance of 0.01 R and it may be embodied in a Solid State Relay (SSR) device. The ends of sense resistor 27 are connected to a simple operational amplifier circuit 28. The processor 22 and the circuit 28 both operate at mains voltage potential so that circuit 28 is capable of amplifying the very small voltage drop across the sense resistor 27. Thus by using a simple analogue compression technique the current range measured with the processor 22 whose 8-bit A/D converter can be extended from less than $50_{M}$A to over 60 A. With this measurement range the status of low wattage lamps (60 W) can be detected as well as overloads on a 50 amp dimmer. The final fault reporting activity of the circuit shown in FIG. 2 is that of the state of the actual load and this is achieved by using amplifier 29 to measure the average voltage across the lamp 1 which forms the load.

The outputs of the temperature sensor 26 and the amplifiers 28 and 29 are supplied to respective inputs 30, 31 and 32 of processor 22 which converts these analogue signals into a stream of serial data for output to the main processor 10 on line 25. This serial data is in standard asynchronous format that can be received by a standard UART. The phase-control hardware of main processor 10 provides a UART with every twelve dimmer firing signal outputs from one of the pulse processors 13,14.

It will thus be appreciated that the output from the temperature sensor 26 and the two operational amplifiers 28,29 are always available but that it is only when the fault processor 22 detects the inserted pulse train in the dimmer firing signal that it transmits the received data to the main processor.

It will be appreciated that the nature of the pulse train added to the basic control signal can be varied in a number of aspects. In particular the added signal could comprise a data word or words. Additionally the actual timing of the added signal in the gap between any pair of firing pulses can be used to impart information. Thus in one embodiment two different pulse gaps can be used to identify two types of poll request. Thus a pulse at one timing can be used to initiate polling of a dimmer, and a pulse at another timing can be used to cause the Fault Reporting Processor to indicate, for example by displaying a red light, that a fault has been detected.

Thus one pulse 130 μs after a firing pulse can be used as a poll request, whilst a pulse 260 μs after the firing pulse will instead request the Fault Processor Circuit to indicate the presence of an already detected fault.

The serial data output by the fault processor 22 on line 25 drives a conventional opto-coupler (not shown) which is connected in parallel with the serial data outputs of the other twenty-three dimmers in the rack.

From the above it will be appreciated that interrogation of a dimmer involves only a relatively minor addition to what is already involved in providing control for the dimmer. Thus when the main processor is controlling a dimmer there will already be a signal supplied to the dimmer and the interrogation procedure merely consists of inserting a very short signal to that control signal. As a result the fault reporting system which has been described is robust-and relatively inexpensive. Where fault reporting for a dimmer in a rack is not required then all that is required is a simple resistor/capacitor filter to remove the added pulses. It will also be appreciated that no special modifications have to be made to a dimmer to make it "addressable" so that faulty units can readily be replaced without additional complications.

It will also be understood that many variations are possible with regard to the detail of the circuits which have just been described. Thus alternative forms of microprocessor may be used and not all of the reporting functions, i.e. temperature sensing, need not be present. Alternatively in a rack different dimmers may be reported on in different detail.

I claim:

1. A monitor circuit for monitoring the operation of a device which is controlled by a phase-locked, pulse-width modulated firing signal, comprising:

(a) a semiconductor switch with an AC operational voltage, said semiconductor switch being triggered by the firing signal;

(b) means for inserting additional data into the firing signal for the device, said means functioning to insert the data in the form of at least one pulse in the gap between the end of a pulse of the firing signal and the next firing signal after the zero-crossing of the AC supply; and (c) means responsive to said additional data to generate data indicating at least one operative state of the device.

2. A circuit according to claim 1, wherein the additional data comprises a pulse train the timing of which with respect to the preceding end pulse of the firing signal determines the nature of the data requested.

3. A circuit according to claim 2, and comprising a main processor generating a plurality of firing signals for a similar number of devices, and wherein at least some of the devices have an associated fault report processor adapted to receive data inserted into the firing signal for its associated device, and to transmit operational data from the device to the main processor via a data line common to those devices which have associated fault reporting processors.

4. A circuit according to claim 3, wherein each device has in its main current path a sense resistor connected to an amplifier so as to transmit to its associated fault processor a signal corresponding to the current through the device.

5. A circuit according to claim 3, wherein each device associated with a fault reporting processor has an associated temperature sensor for measuring the temperature of the device.

6. A circuit according to claim 3, wherein each device associated with a fault reporting processor has means for measuring the voltage across a load supplied by the device.

7. A circuit according to claim 3, wherein the fault reporting processor includes at least one A/D converter for converting analogue data received from the device and/or its load and generating a serial data stream for transmission to the main processor.

8. A method of fault reporting on the operation of a device in which additional-data is inserted into a pulse-width modulated firing signal controlling the firing of a semiconductor switch supplied with an AC voltage, this additional data, which comprises at least one pulse inserted in the gap between the end of a pulse of the firing signal and the next zero-crossing of the AC supply, being detected, and as a result of this detection, data regarding the operative state of the device or its associated load is sent back.

* * * * *